(12) United States Patent
Aslan et al.

(10) Patent No.: US 6,332,710 B1
(45) Date of Patent: Dec. 25, 2001

(54) MULTI-CHANNEL REMOTE DIODE TEMPERATURE SENSOR

(75) Inventors: Mehmet Aslan, Milpitas; Richard Henderson, Sunnyvale, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/621,759

(22) Filed: Jul. 24, 2000

(51) Int. Cl.[7] .................................................. G01K 7/00
(52) U.S. Cl. ............................................ 374/183; 327/512
(58) Field of Search ........................... 327/512; 374/178, 374/183

(56) References Cited

U.S. PATENT DOCUMENTS 5,876,122 * 3/1999 Eryurek ............................. 374/183

* cited by examiner

Primary Examiner—Terry D. Cunningham
Assistant Examiner—Quan Tra
(74) Attorney, Agent, or Firm—Pillsbury Winthrop LLP (57) ABSTRACT

A multi-channel remote diode temperature sensor that receives current flow across a plurality of remote diodes on a plurality of channels at a single negative data pin, is small in size and has reduced noise coupling between channels at the common negative data pin. The noise coupling of the multi-channel remote diode temperature sensor is minimized by placing an output of a low impedance buffer in electrical communication with the negative data pin. The voltage produced by the low impedance buffer automatically stabilizes the common mode voltage at the negative data pin. The size is minimized by configuring all channels of the multi-channel remote diode temperature sensor to share the sole negative data pin, thereby reducing pin count.

8 Claims, 9 Drawing Sheets

MULTI-CHANNEL REMOTE DIODE TEMPERATURE SENSOR

BACKGROUND OF THE INVENTION

1. Field of the Invention

The present invention relates to a temperature sensor circuit, and in particular, to a multi-channel temperature sensor having a single negative input terminal configured to receive input from multiple remote temperature-sensing diodes.

2. Description of the Related Art

When operated at a constant current, the voltage ($V_{for}$) of a forward-biased P/N diode exhibits a negative temperature coefficient of about −2 mV/° C. This property can be utilized to detect temperature. Unfortunately, the absolute value of $V_{for}$ varies according to diode composition and hence the process conditions under which the diode was fabricated. One approach to overcome such process-based variation in $V_{for}$ is to calibrate the current supplied across the P/N junction to match the variation in $V_{for}$ exhibited by a particular diode. However, such a calibration of individual current supplies is impractical for mass produced devices. Another approach is to detect a change in forward-biased diode voltage ($\Delta V_{for}$) for two different applied currents, 1X and NX, where NX is an integer multiple of 1X. Specifically:

$$T = \frac{q\Delta V_{for}}{\eta K \ln(N)}, \text{ where} \tag{I}$$

$T$ = absolute temperature in ° Kelvin;

$q$ = the charge on the carrier (electron charge);

$\Delta V_{for}$ = change in forward-biased voltage;

$K$ = Boltzmann's constant;

$N$ = ratio of the two applied currents; and $\eta$ = ideality factor of diode.

The premise of this approach is the principle that any uncertainty in diode behavior introduced by process variation is eliminated (i.e., cancelled out) by detecting a voltage change for two different currents flowing across the same diode.

Figure 1:
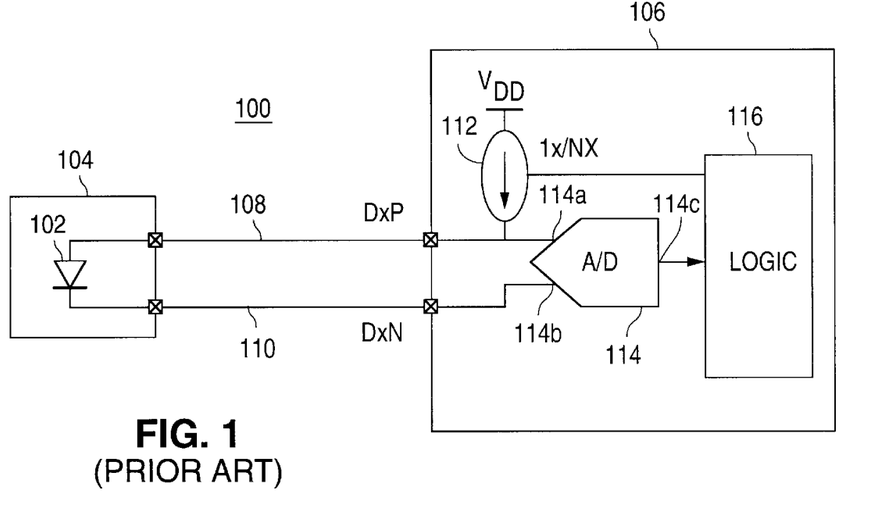
FIG. 1 shows a schematic diagram of a conventional single-channel remote diode temperature sensor circuit.

Accordingly, FIG. 1 shows a schematic diagram of a conventional temperature sensor circuit utilizing this principle to detect ambient temperature. Temperature sensor circuit 100 includes remote diode 102 positioned in remote device 104 and connected with temperature sensor 106 through output line 108 at positive data pin (DxP) and through input line 110 at negative data pin (DxN). While FIG. 1 depicts remote diode 102 as a simple diode remote diode 102 can also take the form of the forward-biased emitter-base P/N junction of a PNP or NPN bipolar transistor.

Temperature sensor 106 also includes variable current supply 112 configured to communicate a current to positive data pin DxP. The output from variable current supply 112 is varied between a base current (1X) and an integer multiple (NX) of the base current, as controlled by logic block 116.

Current output from the positive data pin DxP is communicated through output line 108 to remote diode 102. Current flows across remote diode 102, and is returned back through input line 110 to temperature sensor 106 at the negative data pin DxN.

Temperature sensor 106 includes analog-to-digital (ND) converter 114 having first input terminal 114a, second input terminal 114b, and output terminal 114c. A first current is flowed into remote diode 102, and first input terminal 114a experiences a first voltage corresponding to the flow of this first current into remote diode 102.

A/D converter 114 receives, at second input terminal 114b, a second voltage corresponding to the current flowed across remote diode 102. This second voltage experienced at the second input terminal 114b is a function of (i.e., depends on) the potential drop across remote diode 102. A/D converter 114 samples the difference between the first and second voltages, converts this difference into a digital signal, and communicates this digital signal to logic block 116.

Figure 1A:
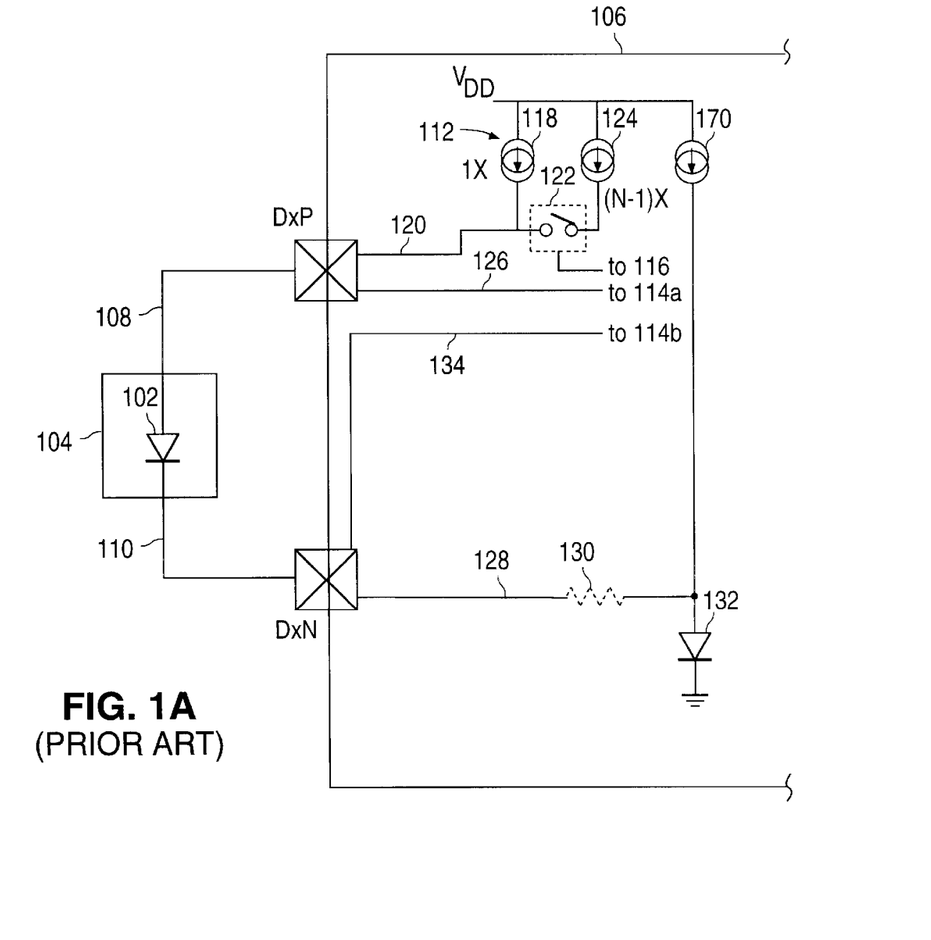
FIG. 1A shows a detailed view of circuitry of the conventional single-channel remote diode temperature sensor circuit of FIG. 1.
Figure 1B:
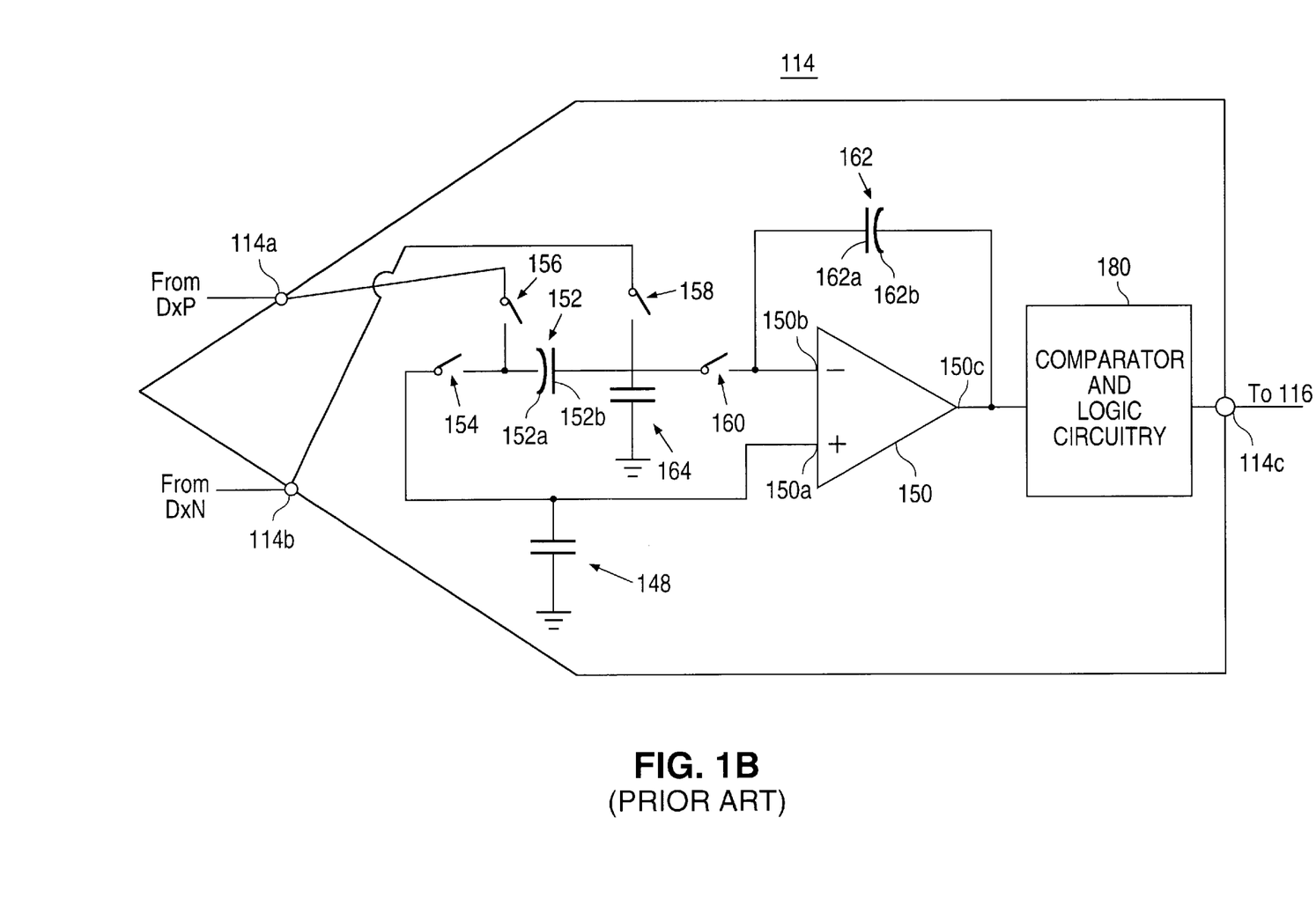
FIG. 1B shows a detailed view of the analog-to-digital converter circuitry of the conventional single-channel remote diode temperature sensor circuit.

Precise operation of the conventional temperature sensor circuit of FIG. 1 is explained in conjunction with FIGS. 1A–1B. FIG. 1A is a detailed view of the circuitry at the DxP pin and DxN pin of temperature sensor 106. FIG. 1B is a detailed view of the circuitry of A/D converter 114 of temperature sensor 106.

First constant current source 118 provides a base current 1X along first force line 120 to the DxP pin. First switch 122 selectively connects second constant current source 124 to first force line 120. Second constant current source 124 provides a supplemental current (N−1)X constituting an integer multiple of the base current 1X output by first constant current source 118. The currents output by the first and second constant current sources 118 and 124 will vary somewhat with temperature, but the ratio of these currents will retain the integer relationship described herein.

First switch 122 is controlled by logic block 116. Initially, first switch 122 is deactivated, and first constant current source 118 alone communicates base current 1X to the DxP pin. The base current 1X flows out of the DxP pin, through output line 108, and across remote diode 102. The resulting voltage on the DxP pin is communicated along first sense line 126 to first input terminal 114a of A/D converter 114.

Current flowing across remote diode 102 is conveyed through input line 110 back to temperature sensor 106 at the DxN pin. This current, then, flows through second force line 128, exhibiting a parasitic resistance represented by resistor 130 in series with diode 132, into ground. Third current supply 170 is also in electrical communication with second force line 128. The resulting voltage on the DxN pin is communicated to second input terminal 114b of AID converter 114 along second sense line 134.

The voltage difference between the DxP and DxN pins represents the voltage drop ($V_{for1}$) across forward-biased remote diode 102 at the base current 1X. This voltage difference is sampled by A/D converter 114, as shown in FIG. 1B.

A/D converter 114 includes voltage reference 148 in electrical communication with non-inverting input node 150a of operational amplifier 150, and also in electrical communication with first plate 152a of sampling capacitor 152 through second switch 154. First input terminal 114a of A/D converter 114 is in electrical communication with first plate 152a of sampling capacitor 152 through third switch 156. One skilled in the art will recognize that A/D converter 114 is representative of a variety of analog-to-digital converters suitable for use in temperature sensor circuits.

Second input terminal 114b of A/D converter 114 is in electrical communication with second plate 152b of sampling capacitor 152 through fourth switch 158. Second plate 152b of sampling capacitor 152 is in electrical communication with inverting input node 150b of operational amplifier 150 through fifth switch 160.

First plate 162a of feedback capacitor 162 is in electrical communication with inverting input node 150b of operational amplifier 150. Second plate 162b of feedback capacitor 162 is in electrical communication with output node 150c of operational amplifier 150.

The A/D converter 114 depicted in FIG. 1B also includes a parasitic capacitor 164 in electrical communication with second plate 152b of sampling capacitor 152. Parasitic capacitor 164 represents the parasitic capacitance arising due to existence of the fourth and fifth switches 158 and 160. In reality, these switches are MOS transistors that experience some form of parasitic capacitance. The charge retained as a result of this parasitic capacitance must be considered during operation of A/D converter 114, and is thus represented as parasitic capacitor 164.

During operation, A/D converter 114 samples the difference in voltage across a remote diode as follows. At an initial phase $M_1$, third switch 156 and fourth switch 158 are closed, while second switch 154 and fifth switch 160 are open. As a result of this configuration, voltage on the DxP pin is transferred to first plate 152a of sampling capacitor 152, and voltage on the DxN pin is transferred to second plate 152b of sampling capacitor 152. Thus, in the first phase $M_1$, charge ($Q_S$) stored on sampling capacitor 152 is given by Equation (II) as:

$$Q_S = C_S(V_{DxP} - V_{DxN}), \qquad (II)$$

where $Q_S$=charge stored on sampling capacitor 152;
$C_S$=capacitance of sampling capacitor 152;
$V_{DxP}$=voltage at the DxP pin; and
$V_{DxN}$=voltage at the DxN pin.

During phase $M_1$, charge ($Q_P$) also accumulates on parasitic capacitor 164 pursuant to Equation (III):

$$Q_P = C_P V_{DxN}, \qquad (III)$$

where $Q_P$=charge stored on parasitic capacitor 164;
$C_P$=capacitance of parasitic capacitor 164; and
$V_{DxN}$=voltage at the DxN pin.

In reality, charge may have already accumulated on all the capacitors from earlier operation (i.e., earlier clock cycles). However, for purposes of simplicity, in this example the initial capacitance of the capacitors are assumed to be zero.

In the next phase $M_2$, third switch 156 and fourth switch 158 are opened, while second switch 154 and fifth switch 160 are closed. As a result of this configuration, the charge on sampling capacitor 152, less the charge retained by parasitic capacitor 164, is transferred to feedback capacitor 162. This is expressed in Equation (IV):

$$Q_{FB} = Q_S - Q_P = C_S(V_{DxP} - V_{DxN}) - C_P(V_{REF} - V_{DxN}), \qquad (IV)$$

where $Q_{FB}$=charge on feedback capacitor 162;
$V_{DxP}$=voltage on the DxP pin during phase $M_1$;
$V_{DxN}$=voltage on the DxN pin during phase $M_1$;
$C_S$=capacitance of sampling capacitor 152;
$C_P$=capacitance of parasitic capacitor 164; and
$V_{REF}$=reference voltage output by voltage reference 148.

Because second switch 154 is closed at phase $M_2$ the charge remaining on parasitic capacitor 164 is shown in Equation (V) below:

$$Q_P = C_P V_{REF}, \qquad (V)$$

where $Q_P$=charge on parasitic capacitor 164;
$C_P$=capacitance of parasitic capacitor 164; and
$V_{REF}$=reference voltage output by voltage reference 148.

Per Coulomb's law, V=Q/C. Therefore, Equation (IV) can be rewritten as:

$$V_{FB} = \frac{C_S}{C_{FB}}(V_{DxP} - V_{DxN}) - \frac{C_P}{C_{FB}}(V_{REF} - V_{DxN}), \text{ where} \qquad (VI)$$

$V_{FB}$ = voltage on feedback capacitor 162;
$C_S$ = capacitance of sampling capacitor 152;
$C_{FB}$ = capacitance of feedback capacitor 162;
$C_P$ = capacitance of parasitic capacitor 164;
$V_{DxN}$ = voltage on the DxN pin during phase $M_1$;
$V_{DxP}$ = voltage on the DxP pin during phase $M_1$; and
$V_{REF}$ = reference voltage output by reference voltage 148.

It is important to recognize that the second term of Equation VI includes as a variable a quantity other than $V_{DxP}-V_{DxN}$, specifically the quantity $V_{REF}-V_{DxN}$. Because of this second term, fluctuation in $V_{DxN}$ can result in a corresponding change in the sampled voltage $V_{FB}$ on feedback capacitor 162. However, stabilizing $V_{DxN}$ can result in the second term of Equation VI representing a simple offset that can be anticipated and compensated for.

Once the voltage corresponding to $V_{for1}$ has been sampled on feedback capacitor 162, this voltage is then transferred to comparator and logic circuitry 180 for conversion into digital form. The digitized signal is output on output terminal 114c and then communicated to logic block 116. After this operation is repeated a suitable number of times (i.e., a suitable number of clock cycles), first switch 122 is activated.

First constant current source 118 provides base current 1X to the DxP pin and second constant current source 124 provides supplemental current (N−1)X to the DxP pin, such that the DxP pin receives a total current of NX. The corresponding output voltage on the DxP pin is communicated along first sense line 126 to first input terminal 114a of A/D converter 114.

The total current NX flows out of the DxP pin through output line 108 and across remote diode 102. Current flowing out of remote diode 102 is conveyed through input line 110 back to temperature sensor 106 at the DxN pin. This current then flows through second force line 128, exhibiting a parasitic resistance represented by resistor 130 in series with diode 132, into ground. The corresponding input voltage on the DxN pin is communicated along second sense line 134 to second input terminal 114b of A/D converter 114.

The difference between voltage at the DxP pin and the voltage at the DxN pin represents the voltage drop $V_{for2}$ across forward-biased remote diode 102 at the elevated current NX. Therefore, A/D converter 114 samples this voltage drop and subsequently generates on output terminal 114c a second digital signal corresponding to $V_{for2}$, in the manner previously described in connection with FIG. 1B for $V_{for1}$.

This second digital signal is fed to logic block 116, where it is compared with the previously stored $V_{for1}$ to determine the charged forward-biased voltage $\Delta V_{for}=V_{for2}-V_{for1}$, and hence the temperature at remote diode 102 and remote device 104 pursuant to Equation (I).

While satisfactory for some applications, conventional temperature sensor circuits, such as the conventional temperature circuit shown in FIGS. 1 and 1A and those employing any known analog-to-digital converter, have several disadvantages.

First, conventional temperature sensor circuits are sensitive to noise. As described in relation to the specific example of FIGS. 1 and 1A and in connection with the second term of Equation (VI), fluctuation of voltage at the DxN pin can substantially affect the accuracy of the sampled signal communicated in the logic block. Thus, where the remote diode is positioned in a noisy environment (e.g., near an active microprocessor), the resulting voltage fluctuation at the DxN pin could adversely affect the accuracy of the digital signal communicated to the logic block.

Second, a temperature sensor of the conventional circuit shown in FIG. 1 is limited to sensing temperature at a single remote location. However, in many applications, it is desirable to monitor ambient temperature at a plurality of remote locations (i.e., monitoring temperature at a CPU, battery and disk drive of a laptop computer).

Third, the pin count of conventional temperature sensors adapted to monitor temperature at multiple remote locations is large due to the multiplicity of positive and negative data pins. The same number of negative data pins is required as the number of positive data pins in such a conventional temperature sensor.

Figure 2:
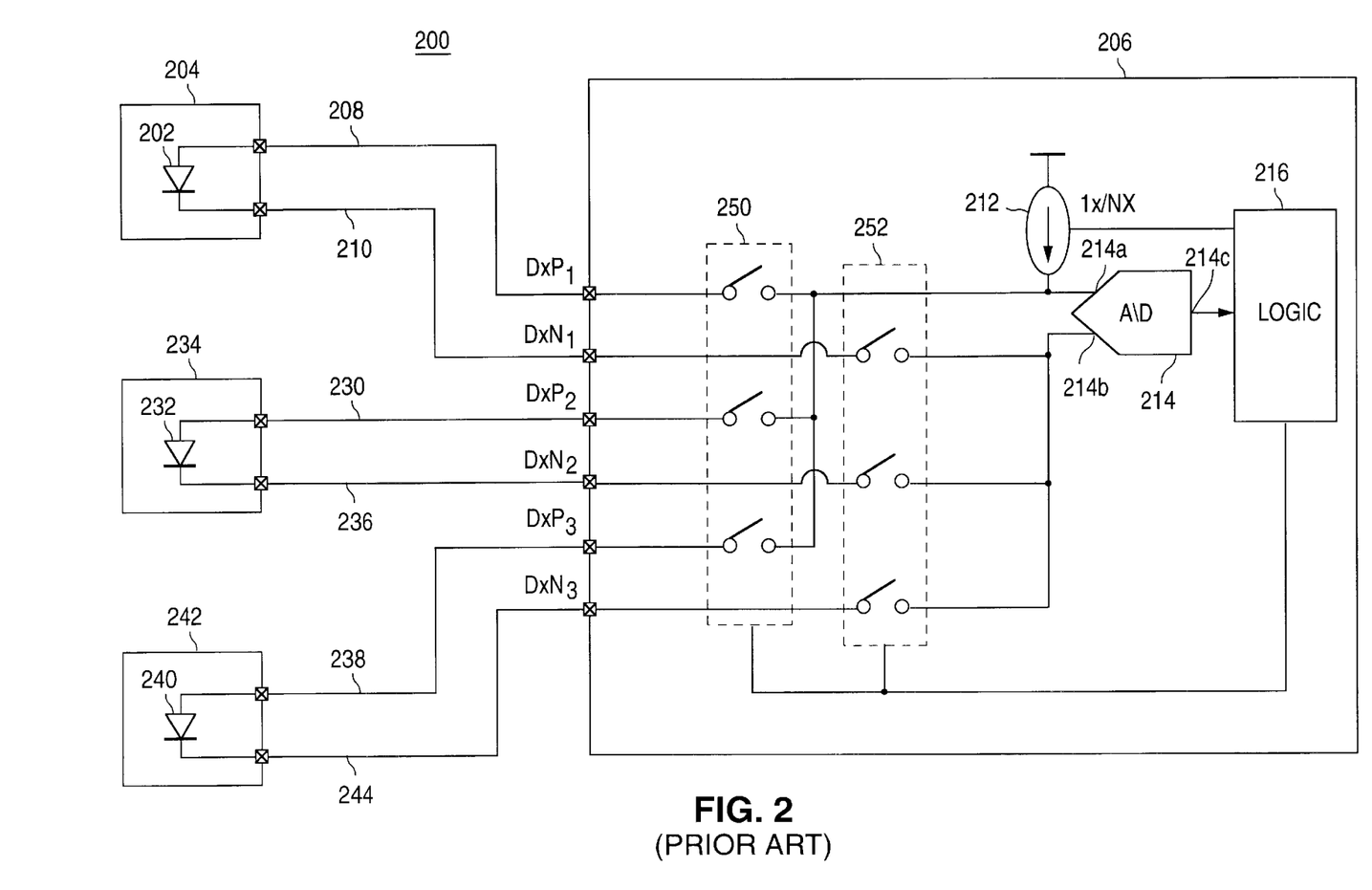
FIG. 2 shows a schematic diagram of a conventional multi-channel remote diode temperature sensor circuit.

For example, FIG. 2 illustrates such a sensor adapted to monitor temperature at three remote locations. Temperature sensor circuit 200 features temperature sensor 206 with three positive data pins $DxP_{1-3}$ and three associated negative data pins $DxN_{1-3}$. Current output from first $DxP_1$ pin is communicated through first output line 208 to first diode 202 located in first remote device 204. Current flows across first diode 202 and is returned back through first input line 210 to temperature sensor 206 at first negative data pin $DxN_1$. Similarly, current output from the second $DxP_2$ pin and the third $DxP_3$ pin is, respectively, communicated through its own output line (230 and 238) to associated diode (232 and 240) located in an associated remote device (234 and 242). Thus, current flows across associated diode (232 or 240) and is returned back through associated input line (236 or 244) to temperature sensor 206 at second negative data pin $DxN_2$ and at third negative data pin $DxN_3$, respectively. Temperature sensor 206 includes two multiplexers, both controlled by logic block 216. First multiplexer 250 selectively connects the output of variable current supply 212 to any desired positive data pin, while second multiplexer 252 selectively connects second A/D input terminal 214b of A/D converter 214 to any desired negative data pin. Selective activation of first and second switches 250 and 252 permits A/D converter 214 to measure $\Delta V_{for}$ at currents 1X and NX for any desired diode.

Therefore, there is still a need in the art for a multi-channel remote diode temperature sensor with reduced pin count and sensitivity to noise.

SUMMARY OF THE INVENTION

A multi-channel temperature sensor in accordance with the present invention is configured to receive current flow across a plurality of remote diodes, via a plurality of input lines, at a single negative data pin. This configuration, which provides a sole negative data pin for these remote diodes, allows the pin count of the multi-channel temperature sensor to be minimized. The multi-channel temperature sensor further includes a low impedance buffer in electrical communication with the single negative data pin to reduce noise coupling between the input lines at this common negative data pin.

A multi-channel temperature sensor according to the present invention includes a plurality of diodes (e.g., P/N diodes) at remote locations, a plurality of positive data pins, a sole negative data pin, a plurality of output lines and a plurality of input lines. The multi-channel temperature sensor also includes a temperature sensor with a variable current supply configured to produce a base current, as well as an integer multiple of the base current. Each of the positive data pins is in electrical communication with the variable current supply. Each of the output lines electrically communicates one of the positive data pins with one of the diodes, while each of the input lines electrically communicates one of the diodes with the negative data pin. The multi-channel temperature sensor further includes an analog-to-digital converter with a first input terminal in electrical communication with the variable current supply, a second input terminal in electrical communication with the negative data pin, and an output terminal. The multi-channel temperature sensor further includes a low impedance buffer with an input node and an output node. The input node is in electrical communication with a voltage reference, while the output node is in electrical communication with the negative data pin. This low impedance buffer is configured to output a voltage with reduced noise coupling between the input lines at the negative data pin.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings, of which.

DETAILED DESCRIPTION

A multi-channel temperature sensor according to the present invention is configured to receive current across a plurality of remote diodes, via a plurality of input lines, at a single negative data pin, thereby keeping its pin count to a minimum. A low impedance buffer is in electrical communication with the single negative data pin, thereby reducing noise coupling between these input lines at this common negative data pin.

Figure 3:
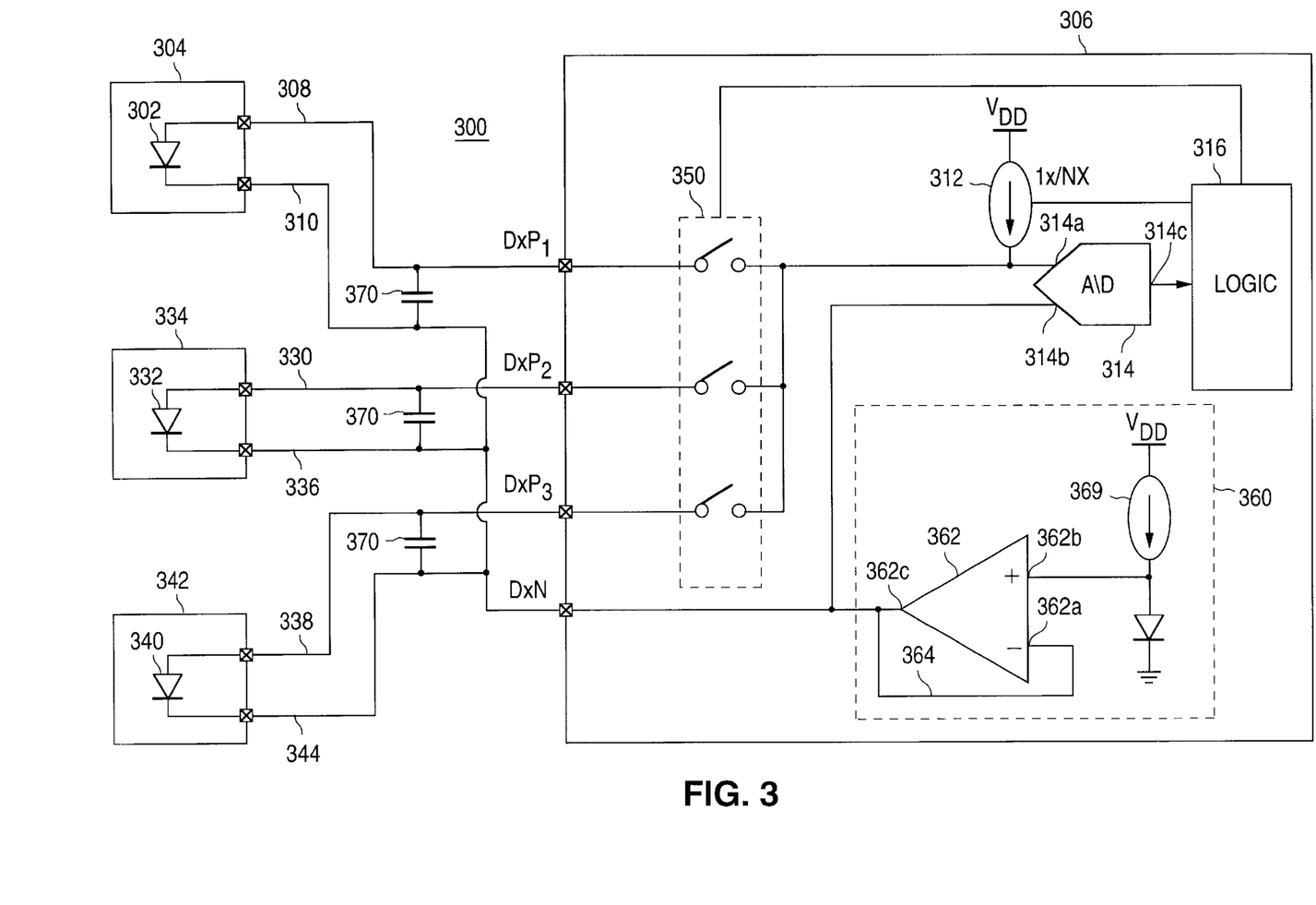
FIG. 3 shows a schematic diagram of a multi-channel remote diode temperature sensor circuit in accordance with the present invention.

For simplicity purposes, a multi-channel temperature sensor according to the present invention will be described in detail using a three-remote diode temperature sensor, as illustrated in FIG. 3. The present invention is, however, equally applicable to, and suitable for, temperature sensors with any number of remote diodes.

A multi-channel temperature sensor circuit 300 includes a temperature sensor 306 with a variable current supply 312 configured to output a current from any one of three positive data pins: first positive data pin $DxP_1$, second positive data pin $DxP_2$ and third positive data pin $DxP_3$. Current output from variable current supply 312 is varied between a base current (1X) and an integer multiple (NX) of the base current, and is communicated through first multiplexer 350 to any one of three output lines: first output line 308, second output line 330 and third output line 338. First output line 308 is in electrical communication with first remote diode 302 of first remote device 304. Second output line 330 is in electrical communication with second remote diode 332 of second remote device 334. Third output line 338 is in electrical communication with third remote diode 340 of third remote device 342. Current flows across any one of these remote diodes (i.e., 302, 332 and 340) and is then returned back to temperature sensor 306 at single negative data pin DxN via associated input lines (i.e., first input line 310, second input line 336 or third input line 344), respectively.

Temperature sensor 306 includes A/D converter 314 with first input terminal 314a, second input terminal 314b, and output terminal 314c. First input terminal 314a of A/D converter 314 experiences voltage, corresponding to current flow from variable current supply 312 into remote diode 302. The, second input terminal 314b of A/D converter 314 experiences a voltage, established by the low impedance buffer 360 at the negative data pin DxN. The difference between these two voltages is a function of the potential drop across the remote diode 302. A/D converter 314 samples the difference between these two voltages and converts it into a digital signal, which is subsequently communicated to logic block 316.

Figure 3A:
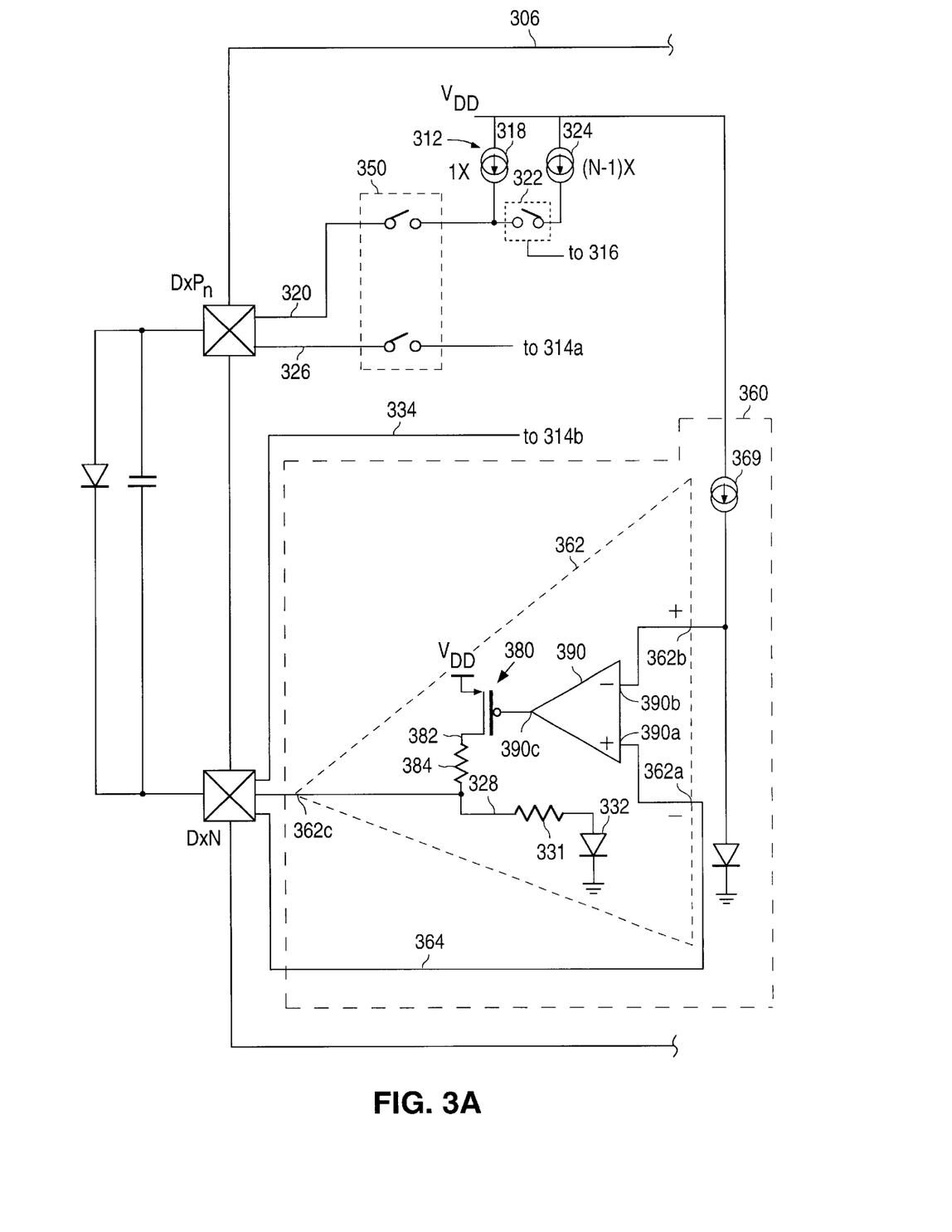
FIG. 3A shows a detailed view of a portion of the circuitry of the multi-channel remote diode temperature sensor of FIG. 3.

Precise operation of the multi-channel temperature sensor circuit 300 is explained in conjunction with FIG. 3A, which shows a detailed view of a single "channel" (i.e., $n^{th}$ channel) of the circuitry that includes a $DxP_n$ pin and the DxN pin of temperature sensor 306. First constant current source 318 provides a base current 1X along force line 320 to the $DxP_n$ pin. Second switch 322 selectively connects second current source 324 to force line 320. Second constant current source 324 provides a supplemental current (N−1)X, constituting an integer multiple of the base current (NX), output by first constant current source 318. The current output by first and second constant current sources 318 and 324 varies somewhat with temperature, but a current ratio maintains the aforementioned integer relationship.

Second switch 322 is controlled by logic block 316. Initially, second switch 322 is deactivated, and first constant current source 318 alone provides base current 1X to the $DxP_n$ pin. The resulting voltage on the $DxP_n$ pin is communicated along first sense line 326 through multiplexer 350 to first input terminal 314a of A/D converter 314. The base current 1X flows out of the $DxP_n$ pin and across the remote diode. Such current is conveyed back to temperature sensor 306 at the single common DxN pin. This forward bias current then flows, through second force line 328, exhibiting a parasitic resistance represented by parasitic resistor 331 in series with diode 332, into ground. The voltage on the DxN pin is communicated along second sense line 334 to second input terminal 314b of A/D converter 314.

The voltage difference between the $DxP_n$ pin and the DxN pin represents the voltage drop $V_{for1}$ across the forward-biased remote diode at the base current 1X. Thus, as previously shown and described in connection with FIG. 1A, A/D converter 314 samples this voltage drop and generates on output terminal 314c a first signal, corresponding to the potential difference $V_{for1}$. This first signal is communicated to logic block 316 and then stored.

Next, second switch 322 is activated. First constant current source 318 provides base current 1X to the $DxP_n$ pin. Second constant current source 324 also provides supplemental current (N−1)X to the $DxP_n$ pin, such that the $DxP_n$ pin receives a total current of NX. The total current NX flows out of the $DxP_n$ pin and across the remote diode. The corresponding output voltage on the $DxP_n$ pin is communicated along first sense line 326 through multiplexer 350 to first input terminal 314a of A/D converter 314. Current flowing across the remote diode is conveyed back to temperature sensor 306 at the single common DxN pin. This current then flows, through second force line 328, exhibiting a parasitic resistance represented by parasitic resistor 331 in series with diode 332, into ground. A corresponding input voltage on the DxN pin is communicated along second sense line 334 to second input terminal 314b of A/D converter 314.

The difference between the voltage at the $DxP_n$ pin and the voltage at the DxN pin represents the voltage drop ($V_{for2}$) across the forward-biased remote diode at the elevated current NX. Therefore, in the manner previously described, A/D converter 314 generates on output terminal 314c a second digital signal corresponding to $V_{for2}$. This second digital signal is fed to logic block 316, where it is compared with the previously stored $V_{for1}$ digital signal to determine the change in forward bias voltage $\Delta V_{for}$ across the diode (i.e., $\Delta V_{for} = V_{for2} - V_{for1}$) and hence the temperature at a particular remote device (i.e., 304, 334 or 342) pursuant to Equation (I).

This unique configuration of electrically communicating all input lines (i.e., 310, 336 and 344), via a single common negative data pin DxN, to temperature sensor 306 decreases pin count in a multi-channel temperature sensor. Accordingly, the size of the multi-channel temperature sensor package can be reduced or allows the freed up pins to be used for other functions. However, this configuration may create problems with noise coupling between these input lines at the common negative data pin. Specifically, because all three input lines share a common negative data pin, noise from one "channel" of a multi-channel temperature sensor may be coupled with noise from another "channel". This noise coupling problem is resolved by incorporating a low impedance buffer 360 in electronic communication with the DxN pin, as shown in FIGS. 3 and 3 A. A typical low impedance value is in the range of 0.6 ohms to 2.0 ohms. Low impedance buffer 360 includes operational amplifier 390 with non-inverting input node 390a, inverting input node 390b and output node 390c. Inverting input node 390b is in electrical communication with third constant current supply 369. Non-inverting input node 390a is in electrical communication with the DxN pin through feedback loop 364.

Output node 390c of operational amplifier 390 is in electrical communication with a gate of PMOS transistor 380. A source of PMOS transistor 380 is in electrical communication with power supply $V_{DD}$, while a drain of PMOS transistor 380 is in electrical communication with the DxN pin through line 382, exhibiting a parasitic resistance represented by parasitic resistor 384.

Low impedance buffer 360 sufficiently attenuates any noise on the DxN pin to bring this noise within the common mode rejection of A/D converter 314. Specifically, voltage fluctuation on the DxN pin attributable to noise coupling occurring between any of the input lines (i.e., 310, 336 or 344) at the common negative data pin is communicated along feedback loop 364 to non-inverting input node 390a of operational amplifier 390. This voltage fluctuation is then compared with stable voltage appearing at inverting input node 390b of operational amplifier 390, and voltage corresponding to the voltage difference at these nodes (i.e., 390a and 390b) is communicated from output node 390c to the gate of PMOS transistor 380. The communication of this voltage to the gate determines the conductance of PMOS transistor 380, and hence current flow from power supply $V_{DD}$ into the DxN pin. In this manner, voltage fluctuation at the DxN pin attributable to such noise coupling is compensated for by current from the power supply $V_{DD}$, as controlled by operational amplifier 390 through PMOS transistor 380.

The low impedance buffer, thus, establishes a common mode bias level on the single negative data pin. Furthermore, noise coupling between the input lines at the common negative data pin is sufficiently attenuated at the low impedance buffer to bring the noise level within the common mode rejection of A/D converter 314. In addition to the operation of low impedance buffer 360, noise on the DxN pin is converted to common mode noise by the presence of a capacitor 370 located between each output line (i.e., 308, 330 and 338) and its respective input line (i.e., 310, 336 and 344) of a remote diode. These capacitors 370 ensure that any random voltage fluctuation (i.e., noise) occurring on any of these input lines is reflected on the corresponding output line of a remote diode, thereby minimizing the effect of such random noise on a potential difference sensed across the remote diode.

Similarly, the effect of any random voltage fluctuation (i.e., noise) on any of the output lines is reflected on the corresponding input line of a remote diode through the capacitors 370.

Figure 4:
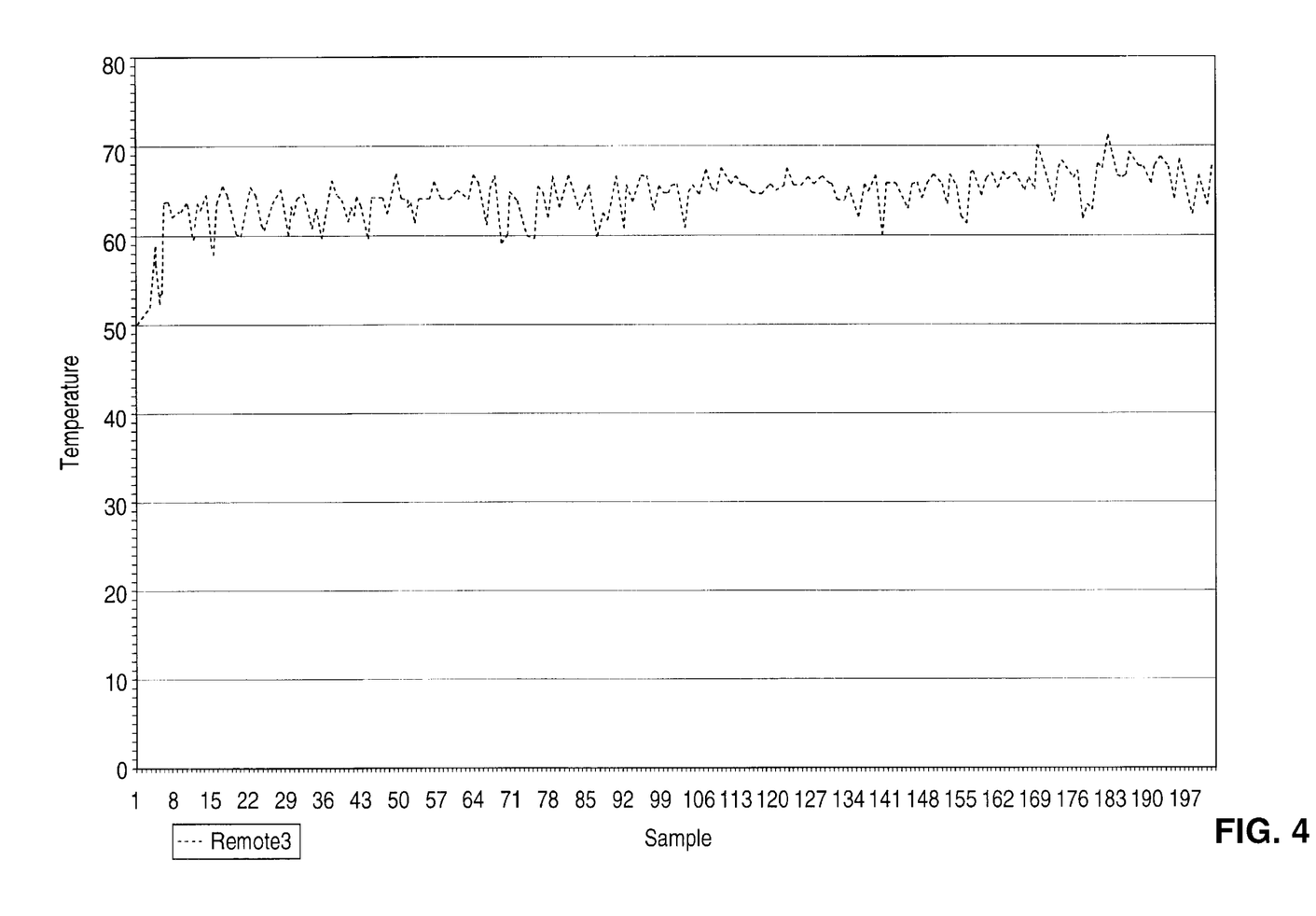
FIG. 4 plots temperature versus sample number of a first noisy remote node of the multi-channel remote diode temperature sensor shown in FIGS. 3 and 3A.
Figure 5:
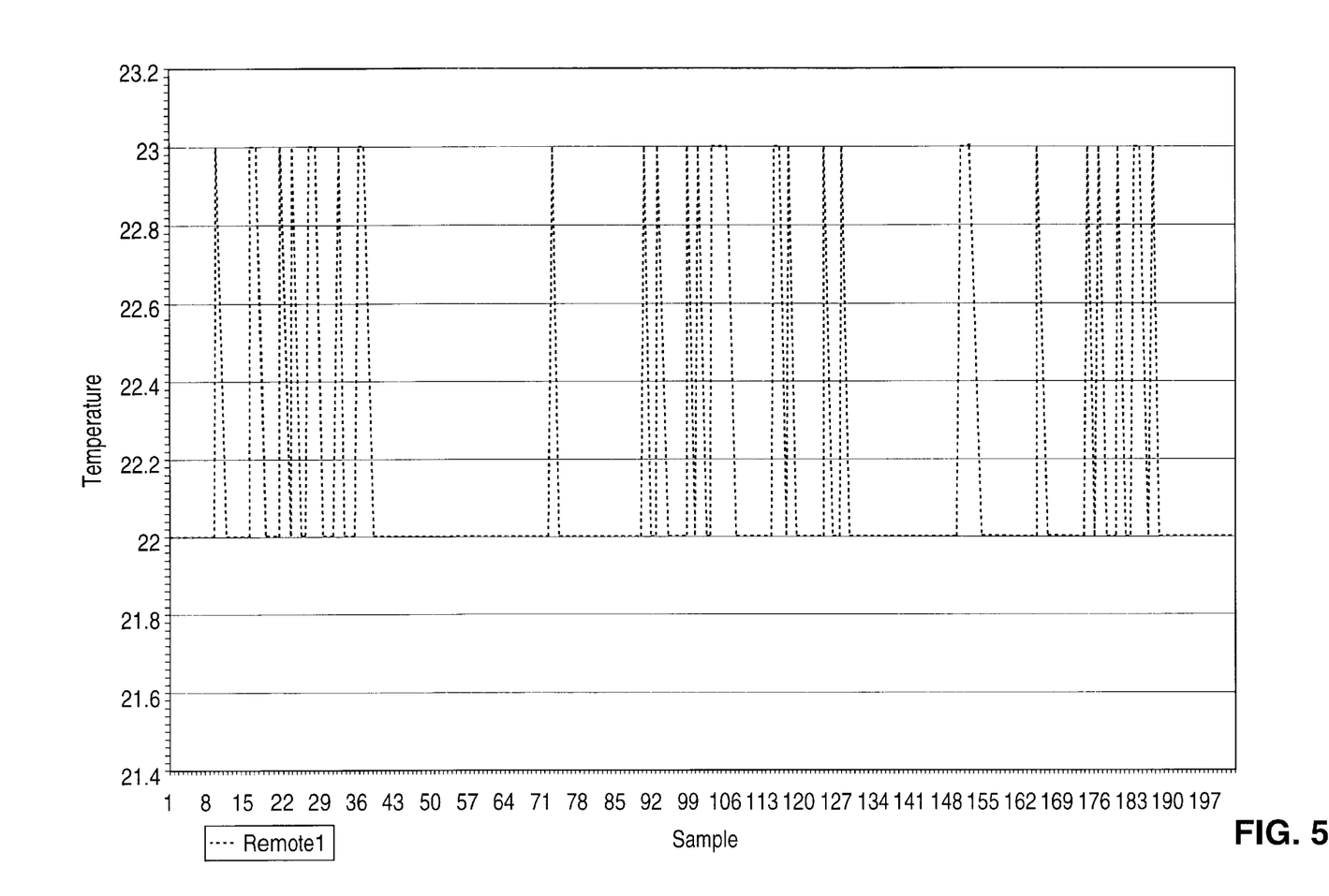
FIG. 5 plots temperature versus sample number of a second quiet remote node of the multi-channel remote diode temperature sensor shown in FIGS. 3 and 3A.
Figure 6:
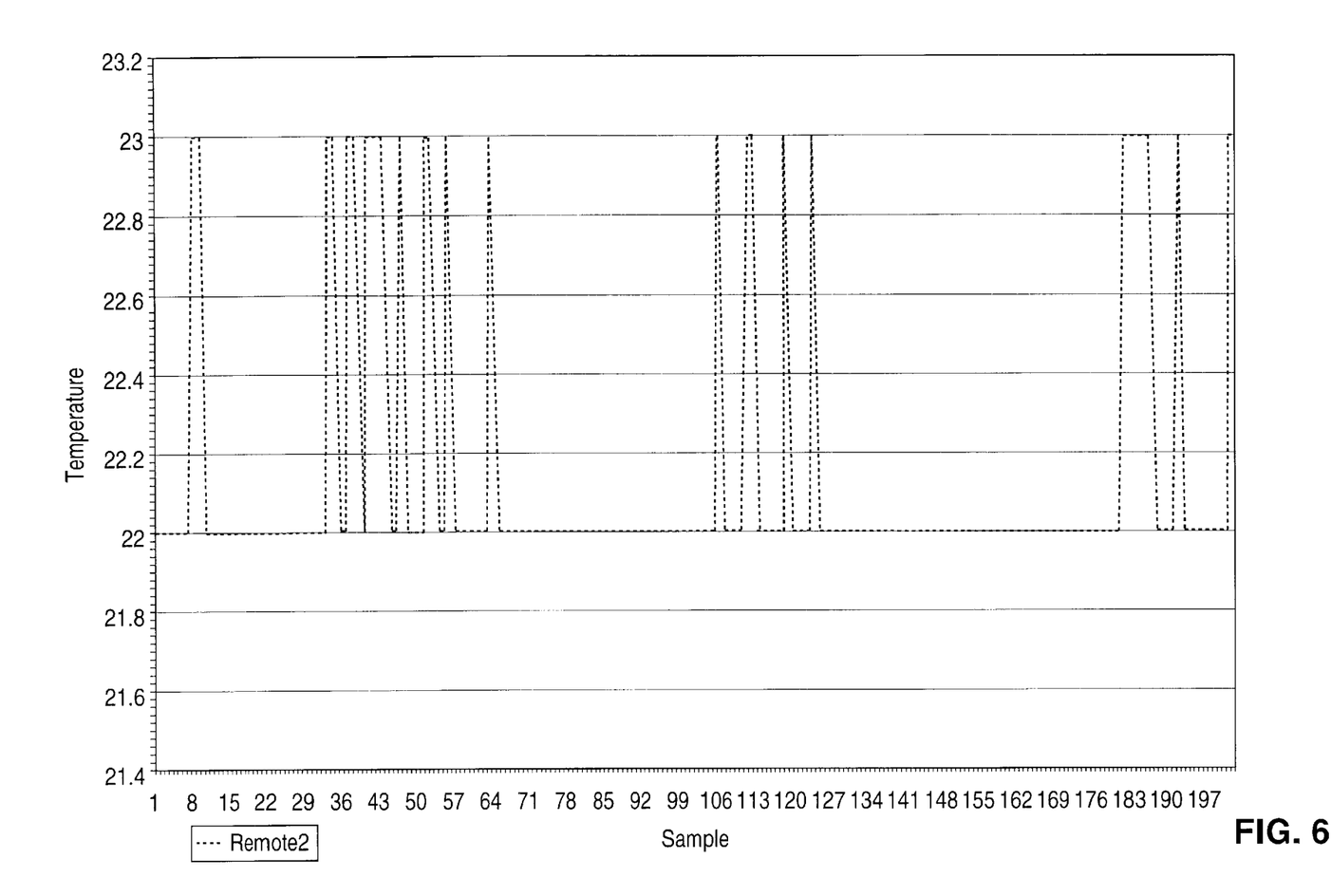
FIG. 6 plots temperature versus sample number of a third quiet remote node of the multi-channel remote diode temperature sensor shown in FIGS. 3 and 3A.

Although all input lines in a multi-channel temperature sensor according to the present invention share a common negative data pin, the effect of noise coupling is insignificant. This is apparent from FIGS. 4–6, each of which plots temperature versus sample number at a different remote diode (i.e., a diode on a different channel) of the multi-channel temperature sensor shown in FIGS. 3 and 3A. Temperature at any of these remote diodes is constant. Despite the constant temperature, the temperature reading at the remote diode of FIG. 4 exhibits significant fluctuation attributable to its proximity to a nearby noisy environment, such as an active and noisy microprocessor. In FIGS. 5–6, temperature is plotted in a magnified scale compared to FIG. 4. FIGS. 5–6 show that noise on that channel (i.e., from the remote diode of FIG. 4) is not transferred to other channels in the multi-channel temperature sensor according to the present invention. (The repeated fluctuation between temperature readings of 23° C. and 22° C. in FIGS. 5–6 is merely an artifact of a quantitized output of the A/D converter for a temperature somewhere between 23° C. and 22° C.).

Although a multi-channel temperature sensor according to the present invention has been described in detail using one embodiment, namely a three-remote diode temperature sensor as illustrated in FIGS. 3 and 3A, the present invention is no way limited to such an embodiment. Rather, the present invention is equally applicable to, and suitable for, temperature sensors with any number of remote diodes. A multi-channel temperature sensor according to the present invention is configured to receive current across a plurality of remote diodes, via a plurality of input lines, at a single negative data pin. A low impedance buffer is in electrical communication with the single negative data pin, thereby reducing noise coupling between these input lines at this common negative data pin. Because all channels in the multi-channel temperature sensor are configured to share the so)e negative data pin, pin count (consequently, the size of the sensor itself) is significantly reduced.

Figure 7:
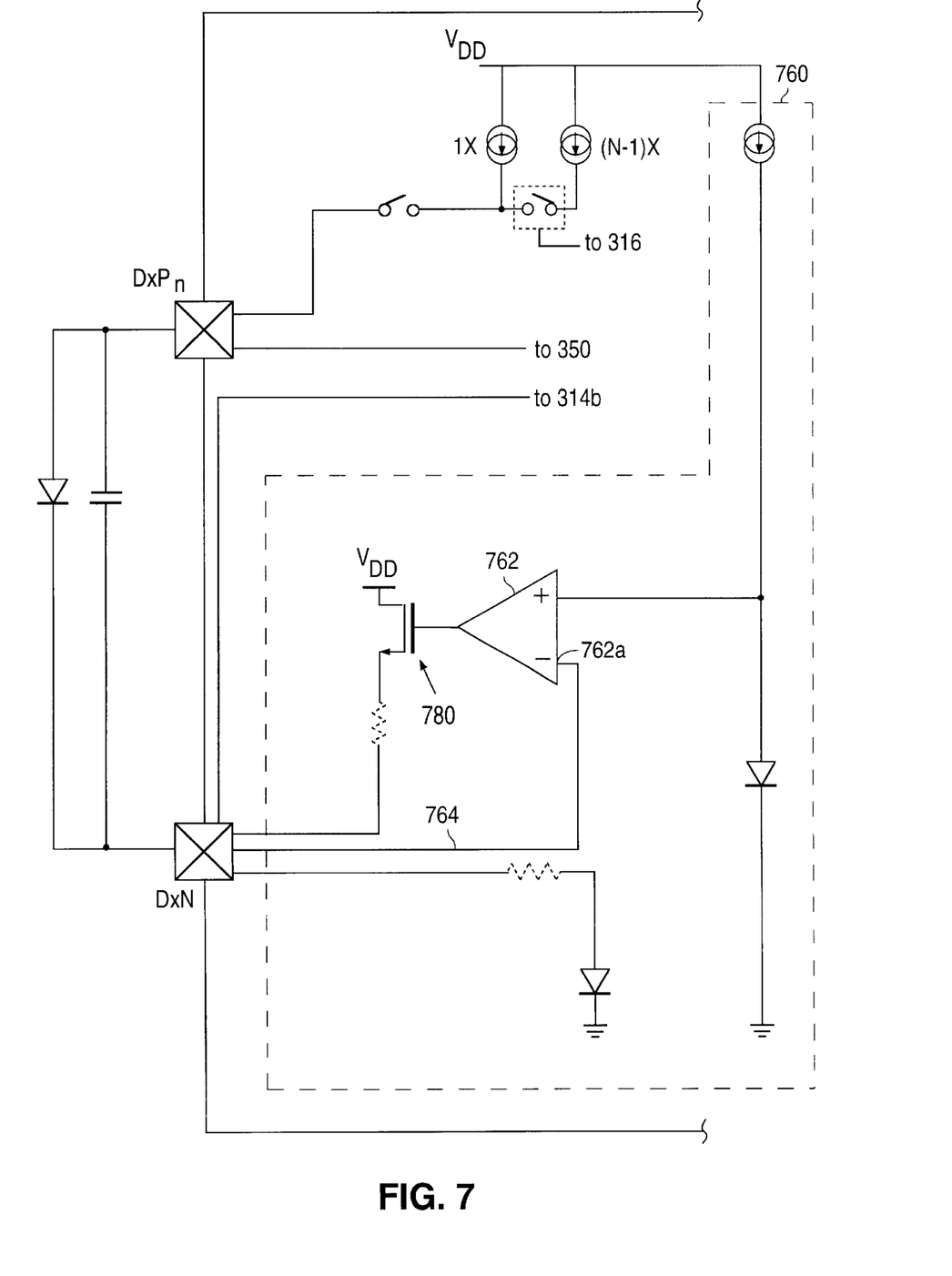
FIG. 7 shows a detailed view of a portion of circuitry of one embodiment of a multi-channel remote diode temperature sensor according to the present invention.

Various modifications and alternatives in the structures will be apparent to those skilled in the art without departing from the scope of the present invention. For example, while FIGS. 3 and 3A show a multi-channel temperature sensor with a low impedance buffer including a PMOS transistor, any type of low impedance buffer can be incorporated. As shown in FIG. 7, low impedance buffer 760 can include NMOS transistor 780, instead. The gate of NMOS transistor 780 receives voltage output by operational amplifier 762. Low impedance buffer 760 further includes feedback loop 764 between the DxN pin and non-inverting input node 762a of operational amplifier 762. Furthermore, a low impedance buffer can also utilize a bipolar transistor having a base controlled by the output of the operational amplifier. In addition, instead of employing a low impedance buffer with a constant current supply and a diode, a low impedance buffer with any voltage reference generator can be substituted (e.g., a low impedance buffer with a band gap device or a low impedance buffer with a resistor-divider device). The fabrication and operation of low impedance buffers are further discussed in Sedra et al., *Microelectronic Circuits*, $3^{rd}$ Ed. (1991), which is hereby fully incorporated by reference. Similarly, while a specific A/D converter architecture has been described above, any other A/D converter known to those skilled in the art can be substituted. Furthermore, diodes included in the present invention can be substituted with a bipolar junction transistor (BJT) of any suitable configurations.

It should be understood that various alternatives to the embodiments of the invention described herein may be employed in practicing the invention. It is intended that the following claims define the scope of the invention and that structures within the scope of these claims and their equivalents be covered thereby.

What is claimed is:

1. A temperature sensor comprising:
   a plurality of remote diodes, each remotely located from one another;
   a temperature sensor including:
      a variable current supply configured to produce either a base current or an integer multiple of the base current;
      a plurality of positive data pins, each in electrical communication with the variable current supply;
      a negative data pin; and
      an analog-to-digital converter having a first input terminal in electrical communication with the variable current supply, a second input terminal in electrical communication with the negative data pin, and an output terminal;
   a plurality of output lines, each electrically communicates one of the positive data pins with one of the remote diodes;

a plurality of input lines, each electrically communicates the negative data pin with one of the remote diodes; and a low impedance buffer with an input node and an output node, the input node in electrical communication with a voltage reference, while the output node in electrical communication with the negative data pin, the low impedance buffer configured to output a voltage attenuating noise crossing between the input lines at the negative data pin.

2. The temperature sensor of claim 1 further including:

a plurality of capacitors, each having a first plate in electrical communication with one of the input lines and a second plate in electrical communication with one the output lines.

3. The temperature sensor of claim 1 wherein the low impedance buffer includes:

an operational amplifier having a first input node in electrical communication with a voltage reference generator, a second input node in electrical communication with the negative data pin, and an output node; and a transistor device having a control node in electrical communication with the output node of the operational amplifier, an input node in electrical communication with a power supply, and an output node in electrical communication with the negative data pin.

4. The temperature sensor of claim 3, wherein the voltage reference generator includes a constant current supply and a diode.

5. The temperature sensor of claim 3, wherein:

the first input node of the operational amplifier includes an inverting input node;

the second node of the operational amplifier includes a non-inverting input node; and the transistor device includes a PMOS transistor with a gate in electrical communication with the output node of the operational amplifier, a source in electrical communication with the power supply, and a drain in electrical communication with the negative data pin.

6. The temperature sensor of claim 3, wherein:

the first input node of the operational amplifier includes an inverting input node;

the second node of the operational amplifier includes a non-inverting input node; and the transistor device includes a PNP transistor with a base in electrical communication with the output node of the operational amplifier, an emitter in electrical communication with the power supply, and a collector in electrical communication with the negative data pin.

7. The temperature sensor of claim 3, wherein:

the first input node of the operational amplifier includes a non-inverting input node;

the second node of the operational amplifier includes an inverting input node; and the transistor device includes a NMOS transistor with a gate in electrical communication with the output node of the operational amplifier, a drain in electrical communication with the power supply, and a source in electrical communication with the negative data pin.

8. The temperature sensor of claim 3, wherein:

the first input node of the operational amplifier includes a non-inverting input node;

the second node of the operational amplifier includes an inverting input node; and the transistor device includes a NPN transistor with a base in electrical communication with the output node of the operational amplifier, a collector in electrical communication with the power supply, and an emitter in electrical communication with the negative data pin.

* * * * *